United States Patent [19]

Tanimoto et al.

[11] Patent Number: 5,560,984
[45] Date of Patent: Oct. 1, 1996

[54] POLYESTER RESIN LAMINATED PLATE AND PROCESS OF PRODUCTION THEREOF

[75] Inventors: Ken'ichi Tanimoto; Yoshiaki Kometani; Kenzou Aki; Makoto Ookubo; Yasuki Nakayama, all of Kyoto, Japan

[73] Assignee: Unitika Ltd., Hyogo, Japan

[21] Appl. No.: 127,993

[22] Filed: Sep. 28, 1993

[30] Foreign Application Priority Data

Oct. 3, 1992 [JP] Japan .................................. 4-289277

[51] Int. Cl.⁶ .............................. B32B 5/14; B32B 5/22; B32B 7/02
[52] U.S. Cl. ...................... 428/237; 428/240; 428/251; 428/283; 428/285; 428/480; 523/214; 524/494
[58] Field of Search ........................ 428/237, 240, 428/251, 283, 285, 480; 523/214; 524/494

[56] References Cited

U.S. PATENT DOCUMENTS

| | | | |
|---|---|---|---|
| 4,726,998 | 2/1988 | Ikenaga et al. | 428/480 |
| 4,806,586 | 2/1989 | Nakai | 523/214 |
| 4,851,287 | 7/1989 | Hartsing, Jr. | 428/325 |

FOREIGN PATENT DOCUMENTS

2-119011   5/1990   Japan .

*Primary Examiner*—Marion E. McCamish
*Assistant Examiner*—Elizabeth M. Cole
*Attorney, Agent, or Firm*—Sughrue, Mion, Zinn, Macpeak & Seas

[57] ABSTRACT

A polyester resin laminated plate which has a smooth surface, has less anisotropy of mechanical properties, is inexpensive, has no restriction in size, thickness, etc., and has a good cutting workability is produced by a process including the steps of melt-extruding a composition including 100 parts by weight of a thermoplastic polyester resin compounded with from about 5 to about 40 parts by weight of a fibrous reinforcing material and from about 5 to about 50 parts by weight of a granular inorganic compound to form sheets, forcibly cooling the sheets to a temperature lower than the glass transition point of the polyester resin to provide plural sheets having a surface crystallinity of less than about 10%, laminating these plural sheets, and hot-pressing them at a pressure of from about 15 to about 150 kg/cm² and at a temperature of from about 80° to about 260° C., with the rate of temperature increase of about 3° C./minute or more to reach the temperature.

11 Claims, No Drawings

POLYESTER RESIN LAMINATED PLATE AND PROCESS OF PRODUCTION THEREOF

FIELD OF THE INVENTION

The present invention relates to a polyester resin laminated plate containing a thermoplastic polyester resin as a matrix which has a smooth surface, has less anisotropy in mechanical properties such as a bending strength, etc., and is excellent in its electric insulating property, dimensional stability, heat resistance, and workability. The present invention also relates to a process for the production of such a polyester resin laminated plate.

BACKGROUND OF THE INVENTION

In general, as a laminated plate, a laminated plate prepared by laminating a varnish of a thermosetting resin such as a phenol resin or an epoxy resin excellent in heat resistance, dimensional stability, strength, electric insulating property, etc., on a base material such as paper or a glass cloth has been widely utilized. However, such a laminated plate has problems in that the production equipment becomes large, the equipment cost becomes high, the productivity is low, and the cost of production is high.

Furthermore, a thermosetting resin is excellent in chemical resistance and water resistance, but when paper is used as the base material for the laminated plate, not only is the paper itself poor in chemical resistance but also the dimensional change by the moisture absorption is large, whereby the industrially usable range is considerably restricted. Also, there remains a problem in that in cutting the laminated plate, a cut powder forms, and further there is an inevitable fault in that three-dimensional molding is very difficult.

A thermoplastic polyester resin such as polyethylene terephthalate (hereinafter referred to as PET), which is excellent in its mechanical property, electric insulating property, heat resistance, chemical resistance, etc., is used in various industrial products and also is used as sheets.

In the case of producing a sheet from a thermoplastic polyester resin, a process of forming the sheet by melt-extruding the polyester resin from a T-die is employed. However, when a thick sheet is produced by the foregoing process, a temperature gradient occurs between the surface portions and the inside of the sheet, whereby a uniform sheet is not obtained.

As a process of producing a laminated plate of a thermoplastic resin, there is a process of obtaining the laminate by laminating plural sheets of the resin and hot-pressing the sheets. A vinyl chloride resin, etc., can produce a laminated plate by this process, but in the case of a thermoplastic polyester resin, when plural sheets of the resin are laminated and hot-pressed, the sheets do not join to each other, whereby a laminated plate can not be obtained.

Also, when a sheet is produced by melt-extruding a polyester resin filled with glass fibers from a T-die, the sheet has a smooth surface and a high elastic modulus in the lengthwise direction (hereinafter referred to as MD), but when the resin is melt-extruded from a T-die, the PET molecule and the glass fibers are oriented to provide the sheet, wherein the bending strength and the bending elastic modulus in the width direction (hereinafter referred to as TD) of the sheet are extremely lower than those in the MD.

JP-A-2-119011 (the term "JP-A" as used herein means an "unexamined published Japanese patent application") proposes an extrusion-molded sheet composed of a polyester resin compounded with a granular inorganic compound for relaxing the orientation of a fibrous reinforcing material, and the effect thereof is large in regard to the anisotropy relaxation of the mechanical property. However, as described above, a uniform thick sheet cannot be obtained by extrusion molding only.

SUMMARY OF THE INVENTION

Under such circumstances, an object of the present invention is to provide a polyester resin laminated plate which is inexpensive, has no restriction in size, thickness, etc., and has a good cutting workability by laminating extrusion-molded polyester resin sheets each having a smooth surface and less anisotropy of the mechanical properties by hot-pressing.

That is, as the result of various investigations, it has been discovered that by hot-pressing under a definite condition to laminate plural sheets each formed by extrusion molding a thermoplastic polyester resin compounded with a definite amount of a fibrous reinforcing material and a definite amount of a granular inorganic compound, a laminated plate wherein the sheets are joined to each other is obtained. The present invention has been accomplished based on this discovery.

In particular, according to an aspect of the present invention, there is provided a polyester resin laminated plate comprising plural sheets each being formed by extruding a composition comprising 100 parts by weight of a thermoplastic polyester resin compounded with from about 5 to about 40 parts by weight of a fibrous reinforcing material and from about 5 to about 50 parts by weight of a granular inorganic compound, the plural sheets being laminated together and hot-pressed to form the plate.

Also, according to another aspect of the present invention, there is provided a process of producing a polyester resin laminated plate, which comprises melt-extruding a composition comprising 100 parts by weight of a thermoplastic polyester resin compounded with from about 5 to about 40 parts by weight of a fibrous reinforcing material and from about 5 to about 50 parts by weight of a granular inorganic compound to form plural sheets, forcibly cooling the sheets to a temperature lower than the glass transition point of the polyester resin to provide plural sheets having a surface crystallinity of less than about 10%, laminating these plural sheets to form a laminated sheet, and hot-pressing the laminated sheet at a pressure of from about 15 to about 150 kg/cm$^2$ and at a temperature of from about 80° to about 260° C., with the rate of temperature increase of about 3° C./minute or more to reach the temperature.

DETAILED DESCRIPTION OF THE INVENTION

The present invention is described in detail below.

As the acid component of the thermoplastic polyester resin being used in the present invention, terephthalic acid, isophthalic acid, 2,6-naphthalenedicarboxylic acid, diphenylmethanedicarboxylic acid, diphenylsulfodicarboxylic acid, p-(β-hydroxyethoxy)benzoic acid, 5-sodiumsulfoisophthalic acid, adipic acid, azelaic acid, sebacic acid, dodecane-1,12-dicarboxylic acid, tetradecane-1,14-dicarboxylic acid, octadecane-1,18-dicarboxylic acid, 6-ethylhexadecane-1,16-dicarboxylic acid, etc., can be used. Among these acids, terephthalic acid, isophthalic acid, and 2,6-naphthalenedicarboxylic acid are particularly preferred.

These acids may be used singly or 2 or more kinds thereof may be used.

As the diol component of the thermoplastic polyester resin being used in this invention, ethylene glycol, propylene glycol, butylene glycol, 1,4-cyclohexane dimethanol, diethylene glycol, pentyl glycol, neopentyl glycol, polytetramethylene glycol, etc., can be used. Among these components, ethylene glycol and 1,4-cyclohexane dimethanol are particularly preferred. These components may be used singly, or 2 or more kinds of these components may be used.

Specific examples of the thermoplastic polyester resin are polyethylene terephthalate, polybutylene terephthalate, polycyclohexylenedimethylene terephthalate, polyethylene naphthalate, and polyesters composed thereof as a main component. In these thermoplastic polyester resins, polyethylene terephthalate or polyester containing at least about 80 mol % ethylene terephthalate units are particularly preferred.

The fibrous reinforcing material being used in the present invention means a fibrous compounding material having good heat resistance and being excellent in mechanical characteristics such as Young's modulus, rigidity, strength, elasticity recovery ratio, etc., such as staple fibers, whiskers, fibrids, etc., and specific examples thereof are inorganic fibers such as glass fibers, carbon fibers, silicon carbide fibers, potassium titanate whiskers, asbestos, etc., and organic fibers such as aramid fibers, etc. Among these materials, glass fibers are most preferred, generally considering the mechanical characteristics, the economy, etc.

There are no particular restrictions on the diameter and the length of the fibrous reinforcing material, but since if the fiber length is too long, it is difficult to uniformly mix with or disperse in the matrix resin and other compounding agent(s), while if the fiber length is too short, the effect as reinforcing material becomes insufficient, fibrous reinforcing material having a fiber length of from about 0.1 to about 10 mm is usually used. (In the case of glass fibers, the fiber length is preferably from about 0.1 to about 7 mm, and more preferably from about 0.3 to about 5 mm.)

Also, for increasing the reinforcing effect by improving the interfacial bonding force with the matrix resin, it is effective to use, if necessary, fibrous reinforcing material treated with various compounds. When the fibrous reinforcing material is glass fibers, glass fibers treated with a silane-series coupling agent such as vinylethoxysilane, γ-methacryloxypropylmethoxysilane, β-(3,4-epoxycyclohexyl)-ethyltrimethoxysilane, γ-glycidoxypropyltrimethoxysilane, γ-chloropropyltrimethoxysilane, γ-aminopropyltrimethoxysilane, γ-mercaptopropyltrimethoxysilane, etc.; a chromium-series coupling agent such as methacrylate chromic chloride, etc., can be used.

The compounding ratio of the fibrous reinforcing material can be selected from a wide range according to the purpose for using the laminated plate, but on considering the balance of the mechanical characteristics, the surface smoothness, and the planeness, the compounding ratio is preferably from about 5 to about 40 parts by weight to 100 parts by weight of the thermoplastic polyester resin. If the compounding ratio of the fibrous reinforcing material is too high, the anisotropy becomes remarkable, which causes undesirably bad effects on the surface smoothness, the planeness, etc., of the laminated plate, and if the compounding ratio is too low, the effect of improving the mechanical characteristics is not sufficiently obtained.

The effect of the granular inorganic compound being used in the present invention differs according to the particle size, the form, and the chemical composition thereof, but the granular inorganic compound functions as a planeness improving agent, a surface smoothness improving agent, a reinforcing agent, a relaxing agent for the anisotropy of the mechanical characteristics, a crystal nucleating agent, etc.

Specific examples of the granular inorganic compound being used in the present invention are mica, glass flakes, talc, wollastonite, silica, calcium carbonate, synthetic silicic acid and silicates, zinc white, clay, kaolin, basic magnesium carbonate, a quartz powder, titanium dioxide, barium sulfate, calcium sulfate, and alumina. Among these compounds, mica and glass flakes give a better result in the present invention.

If the mean particle size of the granular inorganic compound is over about 1,000 μm, the effect thereof is reduced, and hence the granular inorganic compound having a mean particle size of not larger than about 1,000 μm, and particularly from about 1 to about 600 μm, is usually used.

The compounding ratio of the granular inorganic compound can be selected in a wide range according to the purpose for using the laminated plate, but on considering the balance of the mechanical characteristics and the surface smoothness of the laminated plate, the compounding ratio thereof is preferably from about 5 to about 50 parts by weight to 100 parts by weight of the thermoplastic polyester resin. If the compounding ratio of the granular inorganic compound is too low, the effect is small, while if the compounding ratio is too high, it causes bad effects such as lowering of the mechanical characteristics, etc.

Also, in polyester resin sheets which are not compounded with the fibrous reinforcing material and the granular inorganic compound, when the sheets were laminated and hot-pressed as described above, the sheets could not be joined in a body, and further, if the compounding amounts are less than the ranges described above, when the sheets are laminated, the bonding force between the sheets is insufficient.

In the present invention, if necessary, various additives for plastics, such as a heat stabilizer, an antioxidant, a light stabilizer, a lubricant, a pigment, a plasticizer, a crosslinking agent, a shock resisting agent, a flame retardant, a flame-retarding assistant, etc., can be preferably used in addition to the foregoing compounding compounds.

In particular, for a use requiring heat resistance, it is very effective to compound a post-crosslinking type crosslinking agent which is not crosslinked at the formation of the sheets but is crosslinked by a high-energy treatment such as hot-pressing or a high-temperature heat treatment, ultraviolet irradiation, electron ray irradiation, etc., after hot-pressing. Examples of such a compounding agent are triallyl isocyanurate and triallyl cyanurate.

For producing the laminated plate of the present invention, the polyester resin composition compounded with definite amounts of the fibrous reinforcing material and the granular inorganic compound is first melt-extruded to form a sheet. In this case, it is necessary that the sheet thus melt-extruded be forcibly cooled to a temperature of not higher than the glass transition point of the polyester resin by a method of contacting with a cooling roller, etc., to provide the sheet having a surface crystallinity lower than about 10%. If the surface crystallinity of the sheet is higher than about 10%, when these sheets are laminated and hot-pressed, they are not joined in a body, and a laminated plate cannot be obtained.

There is no particular restriction on the thickness of the sheet, but a proper thickness of the sheet can be from about 0.6 to about 1.2 mm. If the thickness of the sheet is too thick, a uniform sheet is not obtained, while if the thickness is too thin, the productivity is undesirably lowered.

The plural sheets thus obtained are laminated and hot-pressed to provide a laminated plate. The number of the sheets is selected according to the thickness of each sheet and the thickness of the desired laminated plate. The number of the sheets which can form a laminated plate is usually from 2 to about 50.

Hot-pressing is carried out using a hot-press molding machine, and in this case, it is necessary that the heating temperature be higher than the glass transition point of the polyester resin. In practice, the heating temperature is usually about 80° C. or more, preferably from about 80° to about 260° C., and more preferably from about 90° to about 200° C. In this case, the rate of temperature increase is also important. As the rate of temperature increase becomes higher, the sheets are more easily laminated in a body. The rate of temperature increase is usually from about 3° to about 20° C./minute, and preferably from about 5° to about 10° C./minute. The pressure at the stage of hot-pressing is usually properly from about 15 to about 150 kg/cm$^2$, and preferably from about 30 to about 100 kg/cm$^2$.

When the plural sheets are laminated, the temperature is raised from room temperature while applying a definite pressure, and after reaching a definite temperature, these sheets are usually kept for from about 3 to about 20 minutes, and preferably from about 5 to about 15 minutes, to complete the hot-pressing.

By increasing the crystallinity of the laminated plate, the mechanical strength and the elasticity of the laminated plate is greatly improved, and the performance of the laminated plate can be maintained up to a temperature near the melting point thereof. Thus, when the laminated plate is used as a rigid plate, it is desirable that the surface crystallinity thereof be at least about 15%, and preferably at least about 25%. For increasing the surface crystallinity, the temperature at hot-pressing may be set high, and the maintaining time may be prolonged.

On the other hand, a laminated plate having a surface crystallinity lower than about 15% and preferably lower than about 10% can be subjected to three-dimensional working by compression molding, pressure forming, vacuum molding and/or bending working, etc., and when the laminated plate is used after being three-dimensionally worked, the temperature at hot-pressing may be set low to provide a laminated plate having a low surface crystallinity.

Since the laminated plate of the present invention has a smooth surface, has less anisotropy of mechanical strength, and is excellent in electric insulation, dimensional stability, the bonding property between the layers, heat resistance, and cutting workability, the laminated plate can be used in various industrial fields. For example, the laminated plate of the present invention can be used as insulating plates of a transformer, a motor, etc.; cutting materials for industrial robots, etc.; baths for an organic solvent; heat resisting ducts; etc.

The present invention is described more practically by the following examples, which should not be construed as limiting the present invention in any way.

The measurement methods and the evaluation methods used in the examples are as follows.

Surface Crystallinity: Measured by infrared total reflection absorption spectra.

Surface Smoothness: Evaluated by the 3 ranks of o good, Δ slightly good, and × no good.

Bending Strength: Measured according to ASTM D790.

Bending Elasticity: Measured according to ASTM D790.

Laminating Property: Evaluated by the 3 ranks of o good, Δ slightly good, and × no good.

Cutting Workability: Evaluated by the 3 ranks of o good, Δ slightly good, and × no good.

Unless otherwise indicated, all parts, percents, ratios and the like are by weight.

EXAMPLES 1 TO 3

PET (glass transition point of from 66° to 67° C.) having an intrinsic viscosity of 0.78 (measured in a mixed solvent of equivalent weight amounts of phenol and tetrachloroethane at 20° C.) was compounded with glass fibers having a diameter of 13 μm and a length of 3 mm as the fibrous reinforcing material and mica having a mean particle size of 100 μm or granular glass flakes (made by Nippon Sheet Glass Company, Limited) as the granular inorganic compound at the ratios shown in Table 1 below, and the mixture was melt-kneaded using a 2-axis extruding machine to provide pellets.

The pellets obtained were melt-extruded by an extruded sheet forming apparatus equipped with a T-die and cooled by a cooling roller at 30° C. to provide sheets each having a thickness of 1.0 mm and a surface crystallinity of about 5%.

Each sheet obtained had a smooth surface and a good appearance.

5 of these sheets were laminated, pressed using a multi-stage pressing machine of 20 stages at a pressure of 40 kg/cm$^2$ with the temperature increasing from room temperature to each hot-pressing temperature shown in Table 1 at a rate of temperature increase of 5° C./minute, and after maintaining for 15 minutes, quickly cooled to provide each laminated plate.

Each laminated plate obtained did not show peeling, warping, etc., and the sheets were laminated well. Also, the result of measuring the bending strength showed a good value in each case. Also, the cutting workability was good, and each laminated plate could be cut well without forming a cutting powder.

EXAMPLES 4 TO 7

By following the same procedure as Examples 1 to 3 using each of the compositions of the compounding ratios shown in Table 1 below, sheets were obtained.

5 of these sheets were laminated, pressed using a multi-stage pressing machine of 20 stages at a pressure of 40 kg/cm$^2$ with the temperature increasing from room temperature to each hot-pressing temperature shown in Table 1 at a rate of temperature increase of 5° C./minute, and after maintaining for 5 minutes, quickly cooled to provide each laminate plate.

Each laminated plate obtained did not show peeling, warping, etc., and the sheets were laminated well.

After each laminated plate was heated in a hot blast furnace at 110° C., the laminated plate was subjected to three-dimensional working by a heating die at 150° C. in a pressure forming machine and kept in the heating die for one minute for crystallization. As a result, a good three-dimensional molding was obtained.

The results of measuring and evaluating the properties of the laminated plates obtained in Examples 1 to 7 are shown in Table 1 below.

COMPARATIVE EXAMPLE 1 TO 7

By following the same procedure as Examples 1 to 3 using each of the compositions having the compounding ratios shown in Table 2, laminated plates were prepared. The results of measuring and evaluating the properties thereof as in Examples 1 to 3 are also shown in Table 2 below.

TABLE 1

|  | Example |  |  |  |  |  |  |
|---|---|---|---|---|---|---|---|
|  | 1 | 2 | 3 | 4 | 5 | 6 | 7 |
| PET (part) | 100 | 100 | 100 | 100 | 100 | 100 | 100 |
| Glass Fibers (part) | 25 | 35 | 25 | 10 | 25 | 35 | 10 |
| Mica (part) | 20 | 25 | — | 10 | 20 | 25 | — |
| Granular Glass Flakes (part) | — | — | 20 | — | — | — | 10 |
| Compounding Workability | ◯ | ◯ | ◯ | ◯ | ◯ | ◯ | ◯ |
| Sheet Surface Smoothness | ◯ | ◯ | ◯ | ◯ | ◯ | ◯ | ◯ |
| Bending Strength |  |  |  |  |  |  |  |
| MD (kg/cm$^2$) | 1,900 | 2,050 | 1,950 | 1,650 | 1,800 | 1,950 | 1,850 |
| TD (kg/cm$^2$) | 1,300 | 1,250 | 1,400 | 1,350 | 1,200 | 1,150 | 1,300 |
| Bending Elasticity |  |  |  |  |  |  |  |
| MD (kg/cm$^2$) | 85,000 | 93,000 | 83,000 | 70,000 | 81,000 | 88,000 | 70,000 |
| TD (kg/cm$^2$) | 56,000 | 56,000 | 45,000 | 41,000 | 50,000 | 55,000 | 43,000 |
| Hot-Pressing Temperature (°C.) | 170 | 170 | 170 | 110 | 100 | 110 | 100 |
| Surface Crystallinity (%) | 33 | 32 | 33 | 9 | 8 | 9 | 8 |
| Laminating Property | ◯ | ◯ | ◯ | ◯ | ◯ | ◯ | ◯ |
| Cutting Workability | ◯ | ◯ | ◯ | ◯ | ◯ | ◯ | ◯ |
| Three-Dimensional Workability | — | — | — | Good | Good | Good | Good |

TABLE 2

|  | Comparative Example |  |  |  |  |  |  |
|---|---|---|---|---|---|---|---|
|  | 1 | 2 | 3 | 4 | 5 | 6 | 7 |
| PET (part) | 100 | 100 | 100 | 100 | 100 | 100 | 100 |
| Glass Fibers (part) | 25 | 3 | 50 | 25 | 3 | — | 25 |
| Mica (part) | 3 | 21 | 21 | 60 | 3 | — | 20 |
| Compounding Workability | ◯ | ◯ | Δ | X | ◯ | — | ◯ |
| Sheet Surface Smoothness | X | ◯ | X | ◯ | ◯ | ◯ | ◯ |
| Bending Strength |  |  |  |  |  |  |  |
| MD (kg/cm$^2$) | 1,950 | 1,450 | 2,000 | 1,900 | 1,600 | 1,420 | — |
| TD (kg/cm$^2$) | 1,050 | 1,040 | 850 | 880 | 1,300 | 1,300 | — |
| Bending Elasticity |  |  |  |  |  |  |  |
| MD (kg/cm$^2$) | 83,000 | 70,000 | 98,000 | 99,000 | 60,000 | 50,000 | — |
| TD (kg/cm$^2$) | 45,000 | 60,000 | 50,000 | 60,000 | 45,000 | 42,000 | — |
| Hot-Pressing Temperature (°C.) | 170 | 170 | 170 | 170 | 170 | 170 | 60 |
| Surface Crystallinity (%) | 31 | 32 | 32 | 32 | 33 | 35 | 7 |
| Laminating Property | ◯ | ◯ | ◯ | ◯ | Δ | X | X |
| Cutting Workability | ◯ | ◯ | Δ | Δ | ◯ | — | — |
| Three-Dimensional Workability | — | — | — | — | — | — | — |

In the laminated plates obtained in Comparative Examples 3 and 4, since the compounding ratios of mica and glass fibers were too high, the cutting of strands was liable to occur at compounding, and the compounding workability was poor in each case.

In the laminated plates obtained in Comparative Examples 1 and 3, since the compounding ratio of glass fibers to mica was large, the surface smoothness of each sheet was bad, and also the anisotropy of the mechanical characteristics of each laminate plate was large.

In the laminated plate obtained in Comparative Example 2, the compounding amount of glass fibers was low, and thus the mechanical characteristics of the laminated plate was inferior. In the laminated plates obtained in Comparative Examples 3 and 4, since the compounding amounts of glass fibers and mica to the matrix resin were large, the cutting workability was bad.

In the laminated plate containing a small amount of the fillers obtained in Comparative Example 5, the laminating property was reduced. In the laminated plate containing no filler obtained in Comparative Example 6 and the laminated plate prepared at a low hot-pressing temperature obtained in Comparative Example 7, the laminating property was bad, and laminated plates could not be obtained in these comparative examples.

While the invention has been described in detail and with reference to specific embodiments thereof, it will be apparent to one skilled in the art that various changes and modifications can be made therein without departing from the spirit and scope thereof.

What is claimed is:

1. A polyester resin laminated plate comprising plural sheets each formed by extrusion molding a composition comprising 100 parts by weight of a thermoplastic polyester resin compounded with from about 5 to about 40 parts by weight of a fibrous reinforcing material and from about 5 to about 50 parts by weight of a granular inorganic compound, said plural sheets being laminated together to form a laminated sheet and hot-pressed at a temperature of about 80° C. or more to form the plate;

wherein the thermoplastic polyester is polyethylene terephthalate;

wherein each of the plurality of sheets before hot-pressing has a surface crystallinity of less than about 10%.

2. A polyester resin laminated plate of claim 1, wherein the fibrous reinforcing material is glass fibers and the granular inorganic compound is mica or glass flakes.

3. A polyester resin laminated plate of claim 1, wherein the plate has a surface crystallinity of at least about 25%.

4. A polyester resin laminated plate of claim 1, wherein the plural sheets range from 2 to about 50 in number.

5. A polyester resin laminated plate of claim 1, wherein the fibrous reinforcing material is glass fibers.

6. A polyester resin laminated plate of claim 5, wherein the glass fibers have a length of from about 0.1 to about 7 mm.

7. A polyester resin laminated plate of claim 6, wherein the glass fibers have a length of from about 0.3 to about 5 mm.

8. A polyester resin laminate plate of claim 1, wherein the granular inorganic compound is mica or glass flakes.

9. A polyester resin laminated plate of claim 1, wherein the granular inorganic compound has a mean particle size of at most about 1000 μm.

10. A polyester resin laminated plate of claim 9, wherein the granular inorganic compound has a mean particle size of from about 1 to about 600 μm.

11. A polyester resin laminated plate of claim 1, wherein the plate has a surface crystallinity of less than about 10%.

* * * * *